United States Patent
Girard, Jr. et al.

(10) Patent No.: US 10,992,086 B2
(45) Date of Patent: *Apr. 27, 2021

(54) HIGH PERFORMANCE CABLE TERMINATION

(71) Applicant: Amphenol Corporation, Wallingford, CT (US)

(72) Inventors: Donald A. Girard, Jr., Bedford, NH (US); David Manter, Goffstown, NH (US); Vysakh Sivarajan, Nashua, NH (US)

(73) Assignee: Amphenol Corporation, Wallingford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/391,013

(22) Filed: Apr. 22, 2019

(65) Prior Publication Data
US 2019/0252832 A1 Aug. 15, 2019

Related U.S. Application Data

(63) Continuation of application No. 15/610,376, filed on May 31, 2017, now Pat. No. 10,312,638.
(Continued)

(51) Int. Cl.
*H01R 13/6592* (2011.01)
*H01R 13/6599* (2011.01)
(Continued)

(52) U.S. Cl.
CPC ..... *H01R 13/6592* (2013.01); *H01R 13/6599* (2013.01); *H01R 13/65917* (2020.08);
(Continued)

(58) Field of Classification Search
CPC H01R 13/6592; H01R 13/6593; H01R 9/037; H01R 13/6599; H01R 13/5845;
(Continued)

(56) References Cited

U.S. PATENT DOCUMENTS

| RE33,611 E | 6/1991 | Michaels et al. |
|---|---|---|
| 5,091,606 A | 2/1992 | Balsells |

(Continued)

FOREIGN PATENT DOCUMENTS

| CN | 101222781 A | 7/2008 |
|---|---|---|
| CN | 104011937 A | 8/2014 |

(Continued)

OTHER PUBLICATIONS

International Search Report and Written Opinion for International Application No. PCT/US2017/035178 dated Aug. 18, 2017.
(Continued)

*Primary Examiner* — Renee S Luebke
*Assistant Examiner* — Paul D Baillargeon
(74) *Attorney, Agent, or Firm* — Wolf, Greenfield & Sacks, P.C.

(57) ABSTRACT

A cable assembly comprising a termination with at least one conductive, compressible member and a conductive ground shield. The conductive, compressible member may be held within a connector module forming the termination such that the conductive compressive member is pressed against, and therefore makes electrical contact with, both an outer conductive layer of the cable and ground structures within the connector module. In some embodiments, these connections may be formed using a conductive, compressible member with an opening configured to receive the end of the cable therethrough. The conductive ground shield may be configured to compress the conductive, compressible member, and to cause the conductive, compressible member to electrically contact the cable's conductive layer. The conductive, compressible member may be formed from a compressible material and may comprise a plurality of conductive particulates configured to provide electrically conductive paths.

29 Claims, 12 Drawing Sheets

Related U.S. Application Data

(60) Provisional application No. 62/343,625, filed on May 31, 2016.

(51) Int. Cl.

| | | |
|---|---|---|
| *H02G 15/064* | (2006.01) | |
| *H01R 13/6591* | (2011.01) | |
| *H01R 13/58* | (2006.01) | |
| *H01R 13/405* | (2006.01) | |
| *H01R 13/6584* | (2011.01) | |
| *H01R 13/24* | (2006.01) | |

(52) U.S. Cl.
CPC ....... *H02G 15/064* (2013.01); *H01R 13/2414* (2013.01); *H01R 13/405* (2013.01); *H01R 13/5808* (2013.01); *H01R 13/5845* (2013.01); *H01R 13/6584* (2013.01)

(58) Field of Classification Search
CPC ............ H01R 13/2414; H01R 13/6584; H01R 13/405
USPC ........... 439/86, 88, 89, 90, 98, 99, 101, 108, 439/607.18, 927
See application file for complete search history.

(56) References Cited

U.S. PATENT DOCUMENTS

| | | | | |
|---|---|---|---|---|
| 5,483,020 | A * | 1/1996 | Hardie | ................. H01B 11/203 156/51 |
| 5,785,555 | A | 7/1998 | O'Sullivan et al. | |
| 5,855,493 | A | 1/1999 | Shelly | |
| 6,380,485 | B1 | 4/2002 | Beaman et al. | |
| 6,902,688 | B2 | 6/2005 | Narayan et al. | |
| 7,158,376 | B2 * | 1/2007 | Richardson | ........... G06F 1/1626 361/679.56 |
| 7,906,730 | B2 | 3/2011 | Atkinson et al. | |
| 8,360,805 | B2 | 1/2013 | Schwarz | |
| 9,035,200 | B2 * | 5/2015 | Kato | ...................... H02G 15/02 174/359 |
| 9,246,278 | B1 | 1/2016 | Dunwoody et al. | |
| 10,312,638 | B2 | 6/2019 | Girard, Jr. | |
| 2003/0045140 | A1 | 3/2003 | Syed et al. | |
| 2012/0094531 | A1 | 4/2012 | Mathews | |
| 2012/0145429 | A1 | 6/2012 | Nordin et al. | |
| 2012/0252266 | A1 | 10/2012 | Ling et al. | |
| 2015/0288108 | A1 | 10/2015 | Fischer | |
| 2017/0346234 | A1 | 11/2017 | Girard | |

FOREIGN PATENT DOCUMENTS

| | | |
|---|---|---|
| CN | 105390857 A | 3/2016 |
| CN | 105406286 A | 3/2016 |
| WO | WO 97/12428 A1 | 4/1997 |
| WO | WO 2015/112717 A1 | 7/2015 |

OTHER PUBLICATIONS

Montemayor, Electrically Conductive Silicone Adhesive. Dow Corning Corp. SMTA International Conference, Sep. 2002. 7 pages.
Chinese communication in connection with Chinese Application No. 201780046854.5 dated Nov. 28, 2019.
U.S. Appl. No. 15/610,376, filed May 31, 2017, Girard.
PCT/US2017/035178, Aug. 18, 2017, International Search Report and Written Opinion.
CN 201780046854.5, Oct. 10, 2020, Chinese Office Action.
Chinese Office Action for Chinese Application No. 201780046854.5, dated Oct. 10, 2020.

* cited by examiner

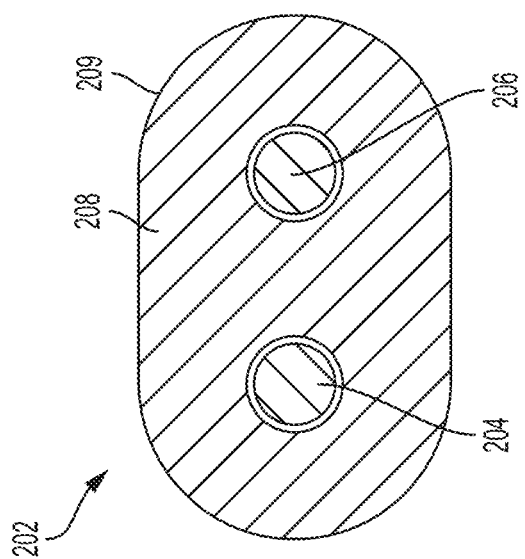
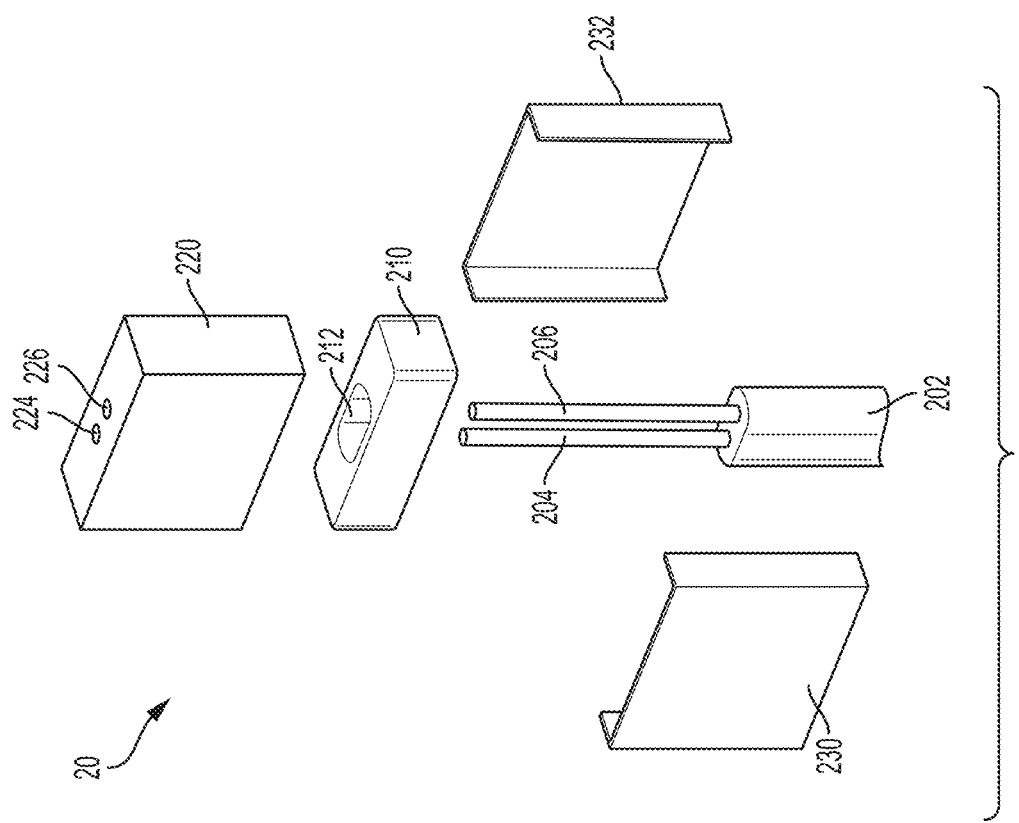

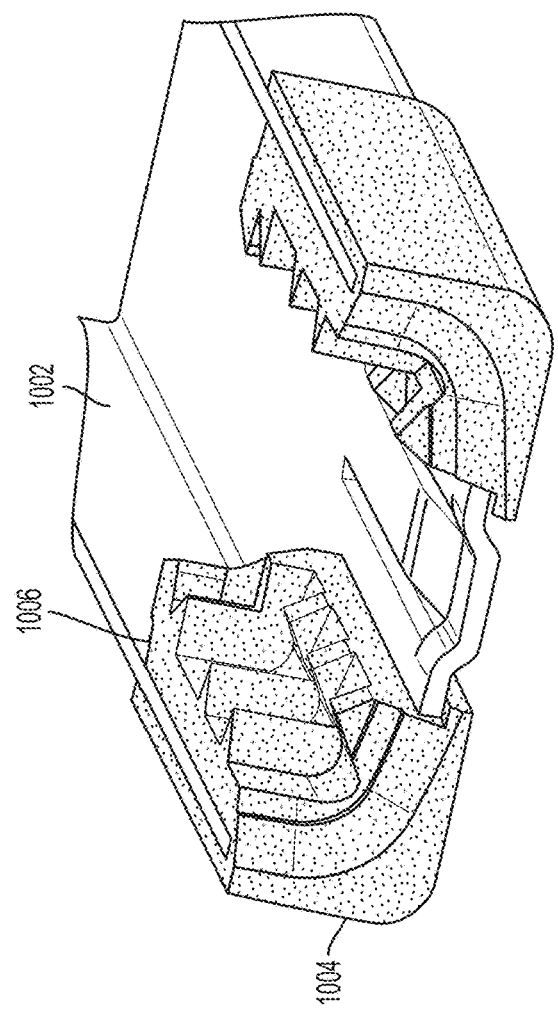
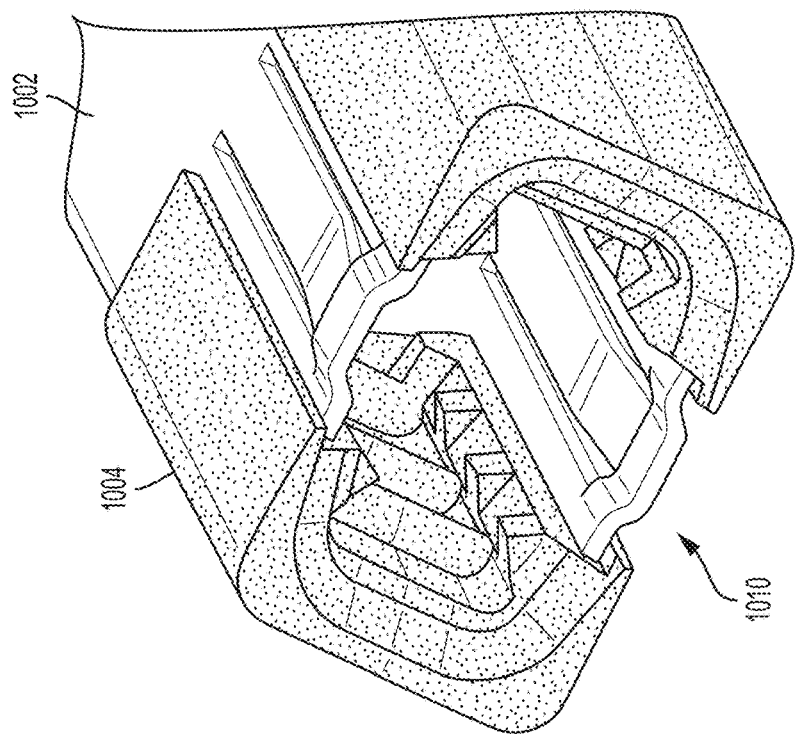

HIGH PERFORMANCE CABLE TERMINATION

RELATED APPLICATIONS

This Application is a continuation of U.S. application Ser. No. 15/610,376, filed May 31, 2017, and entitled "HIGH PERFORMANCE CABLE TERMINATION," which claims priority to and the benefit under 35 U.S.C. § 119(e) of U.S. Provisional Patent Application Ser. No. 62/343,625, filed on May 31, 2016, and entitled "HIGH PERFORMANCE CABLE TERMINATION." The entire contents of these applications are incorporated herein by reference in their entirety.

BACKGROUND

This patent application relates generally to electrical cables used to transmit signals between electronic devices, such as servers and routers.

Cables are often terminated at their ends with electrical connectors that mate with corresponding connectors on the electronic devices, enabling quick interconnection of the electronic devices.

A cable provides signal paths with high signal integrity, particularly for high frequency signals, such as those above 40 Gbps using an NRZ protocol. Each cable has one or more signal conductors, which is surrounded by a dielectric material, which in turn is surrounded by a conductive layer. A protective jacket, often made of plastic, may surround these components. Additionally the jacket or other portions of the cable may include fibers or other structures for mechanical support.

The components of the cable that predominately impact signal propagation, i.e., the signal conductor, the dielectric and conductive layer, are generally uniform over the length of the cable. Non-uniformities on a signal path, such as might be created by changes in shape or material of the components, give rise to changes in impedance or promote mode conversion, which reduce signal integrity, as these effects are manifested as insertion loss, crosstalk or other undesirable effects.

The signal conductor, dielectric and conductive layer are flexible, giving rise to a desirable property of cables. The flexibility enables uniform cable properties to be maintained even if the cable is routed with many bends, promoting signal transmission with high integrity.

One type of cable, referred to as a "twinax cable," is constructed to support transmission of a differential signal and has a balanced pair of signal wires, is embedded in a dielectric, and encircled by a conductive layer. In addition to uniform dimensions of the signal wires over the length of the cable, the spacing of the wires relative to each other and to the conductive layer is maintained over the length of the cable because those components are positioned by the dielectric. Such a cable may be formed by extruding the dielectric around the signal wires.

The conductive layer is usually formed using foil, such as aluminized Mylar, or wire braid wrapped around the surface of the dielectric. The conductive layer influences the characteristic impedance in the cable and provides shielding that reduces crosstalk between signal conductors in twinax cables that may be routed together as a cable bundle. The conductive layer also forms the cable ground reference.

A twinax cable can also have a drain wire. Unlike a signal wire, which is generally coated with a dielectric to prevent electrical contact with other conductors in the cable, the drain wire may be uncoated so that it contacts the conductive layer at multiple points over the length of the cable. At an end of the cable, where the cable is to be terminated to a connector or other terminating structure, the protective jacket, dielectric and the foil may be removed, leaving portions of the signal wires and the drain wire exposed at the end of the cable. These wires may be attached to a terminating structure, such as a connector. The signal wires may be attached to conductive elements serving as mating contacts in the connector structure. The drain wire may be attached to a ground conductor in the terminating structure. In this way, any ground return path may be continued from the cable to the terminating structure.

SUMMARY

According to one aspect of the present application, a cable assembly is provided. The cable assembly may comprise a cable comprising an end, and an electrical termination. The electrical termination may comprise a conductive ground shield enclosing, at least in part, the end of the cable, and a conductive, compressible member disposed between, and in electrical contact with, the end of the cable and the conductive ground shield.

According to another aspect of the present application, an electrical connector is provided. The electrical connector may comprise a plurality of cable assemblies disposed in one or more columns, each one of the plurality of cable assemblies comprising an electrical termination for a cable, the cable comprising an end. The electrical termination may comprise the end of the cable, a conductive ground shield enclosing, at least in part, the end of the cable, and a conductive, compressible member disposed between, and in electrical contact with, the end of the cable and the conductive ground shield.

According to yet another aspect of the present application, a method for terminating an electrical cable with an electrical termination comprising a conductive, compressible member is provided. The method may comprise inserting an end of the electrical cable in an opening in the conductive, compressible member, the end of the cable comprising an exposed conductive layer surrounding at least one signal conductor. The method may further comprise securing a first portion of a conductive ground shield to a second portion of the conductive ground shield with the first portion contacting a first side of the conductive, compressible member and the second portion of the conductive ground shield contacting a second side of the conductive, compressible member such that the conductive, compressible member is compressed between the first portion and the second portion of the conductive ground shield so as to make electrical connection between the conductive layer and the conductive ground shield.

According to yet another aspect of the present application, a connector module for terminating a cable with an outer perimeter is provided. The connector module may comprise a conductive, compressible member having an opening there through, the opening being sized to have, in an uncompressed state, an interior perimeter greater than the outer perimeter of the cable and, in a compressed state, an interior perimeter less than or equal to the outer perimeter of the cable, and a conductive ground shield contacting and enclosing, at least in part, the conductive, compressible member.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A is an exploded view of an exemplary cable assembly comprising a conductive, compressible member, in accordance with some embodiments;

FIG. 2B is a cross sectional view of an exemplary electrical cable, in accordance with some embodiments;

FIGS. 10A-10C illustrate a conductive ground shield having a conductive, compressible member attached thereon, in accordance with some embodiments.

DETAILED DESCRIPTION

Figure 1A:
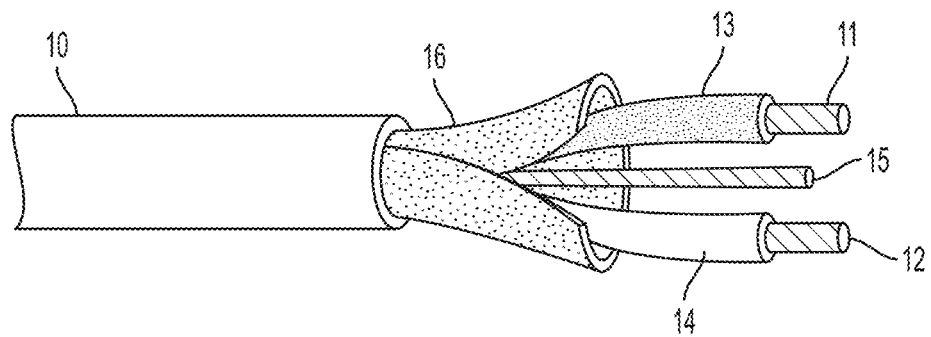
FIG. 1A is an isometric view of an electrical cable including a drain wire.

The inventors have recognized and appreciated that a conductive, compressible member used in a cable termination may provide a high performance cable interconnection system. The conductive, compressible member may be positioned between a conductive layer of a cable and a conductive member on a terminating structure, such as a connector. Any jacket or insulating covering on the conductive layer may be removed at the cable termination such that the conductive, compressible member may make an electrical connection to both the conductive layer of the cable and the conductive member of the terminating structure.

The conductive member, the conductive layer, and the conductive, compressible member may be mounted so that the conductive, compressible member is compressed between the conductive member and the conductive layer. The compression may create a reliable electrical connection between the conductive layer of the cable and the conductive, compressible member of the terminating structure via the conductive, compressible member. When compressed between the conductive member and the conductive layer, the conductive compressible member may form a contact with the conductive layer of less than 100 Ohms in some embodiments, less than 75 Ohms in some embodiments, less than 50 Ohms in some embodiments, less than 25 Ohms in some embodiments, less than 10 Ohms in some embodiments, less than 5 Ohms in some embodiments or less than 1 Ohm in some embodiments. When compressed between the conductive member and the conductive layer, the conductive compressible member may form a contact with the conductive layer of at least 0.5 Ohms in some embodiments, at least 1 Ohm in some embodiments, at least 5 Ohms in some embodiments, at least 10 Ohms in some embodiments, at least 25 Ohms in some embodiments or at least 50 Ohms in some embodiments. In such embodiments, the connection may be suitable for grounding.

The compressive force may be created by members in the terminating structure, which may be a separate structure or may be the conductive member. In some embodiments, the conductive member may be a portion of a structure that encircles the cable termination with a perimeter smaller than the uncompressed perimeter of the conductive, compressible member.

In some embodiments, the terminating structure may be a cable connector, or a portion of a cable connector, and the conductive member may be a reference conductor or shielding member in the cable connector. As a specific example, the portion of the cable connector may be a module, holding a pair of signal conductors encircled by the conductive element. Multiple such modules may be positioned in an array to form a connector terminating a cable bundle.

Electrical terminations of the type described herein may be configured to terminate any suitable type of electric cable, such as twinax cables and coax cables.

The conductive element may be a portion of a multi-piece shell that encircles at least the cable termination of the module. That multi-piece shell may be conductive, forming shielding for the module.

In some embodiments, the conductive, compressible member may be a conductive elastomer. A conductive elastomer may be formed by adding conductive filler to an elastomer. In some embodiments, the elastomer may be configured to elongate by a percentage that is at least 90%. In some embodiments, the elastomer may be configured to elongate, without breaking, by a percentage that is less than 1120%. The elastomer, for example, may be a silicone rubber. The filler may be particles in any suitable form, including plates, spheres, fibers, or of any other suitable geometry. As a specific example, the conductive, compressible member may be made of silver-plated glass micro spheres suspended in high consistency rubber (HCR) silicone.

The filler may comprise a sufficient portion of the conductive, compressible member such that there is contact between conductive fillers when the conductive, compressible member is compressed. Such a conductive, compressible member may be formed by filling an elastomer or other suitable compressible matrix with conductive fillers at a volume percentage between 25% and 95% in an uncompressed state, in some embodiments. In some embodiments, the volume percentage may be between 45% and 90% or between 60% and 90%.

In some embodiments, the fillers may be of materials or present in an amount that results in a bulk resistivity in a range of $10^{-6}$ ohm-cm to $10^{-1}$ ohm-cm.

Cable assemblies, using a conductive, compressible member as part of a termination as described herein, may use cables without drain wires. Such cable assemblies may be lighter and more flexible. Moreover, the use of such cable assemblies may simplify the operation for terminating the cable.

FIG. 1A illustrates a conventional electrical cable. Electrical cable 10, also referred to as "twinax cable", comprises signal wires 11 and 12, which are covered by dielectric coating 13 and 14 respectively. The cable further comprises a third, uncovered wire 15, referred to as "drain wire". Signal wires 11 and 12 and drain wire 15 are surrounded by conductive layer 16, which is configured to serve as an electric shield. The drain wire 15 electrically contacts the conductive layer 16 at multiple locations along the cable (not shown), thus maintaining a ground reference with the conductive layer. As illustrated in FIG. 1A, the enclosing jacket and the conductive layer have been removed from the end of the cable to permit termination.

Figure 1B:
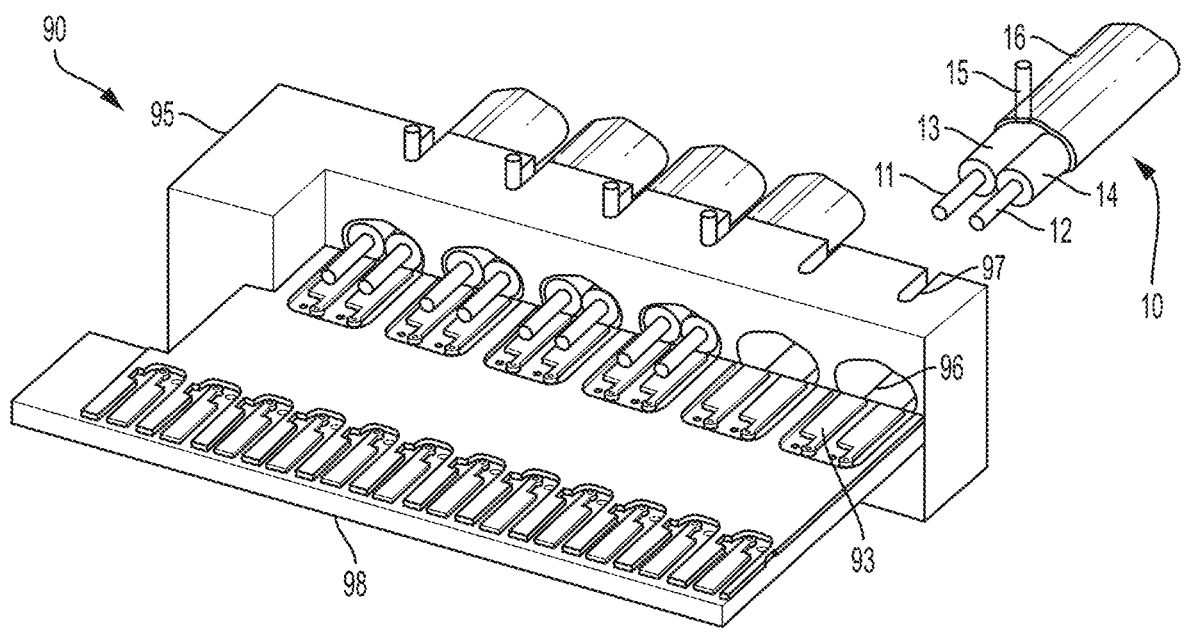
FIG. 1B is an isometric view of a connector configured to operate in connection with the electrical cable of FIG. 1A.

FIG. 1B illustrates a connector 90 configured to receive one or more cables 10. Connector 90 comprises a circuit board 98 and grounding portion 95. Grounding portion 95 includes a plurality of openings 96, each configured to receive a cable 10. When a cable 10 is inserted into an opening 96, signal wires 11 and 12 form electrical contacts with contact portions 93. Furthermore, grounding portion 95 includes a plurality of slots 97, each slot being configured to receive therein the drain wire of the corresponding cable 10. The grounding portion may contact the various drain wires, thus keeping the cables grounded. While the use of drain wires ensures signal integrity throughout the length of the cable, having to include an additional wire may add weight and reduce the flexibility of the cable.

According to one aspect of the present application, the flexibility of the cables and the cost associated with the termination of the cables may be reduced by using electrical terminations comprising a conductive, compressible material. FIG. 2A is an exploded view of a cable assembly, in accordance with some embodiments. Cable termination 20 may comprise the end of a cable 202, a conductive, compressible member 210, a dielectric member 220, and conductive ground shield portions 230 and 232.

Cable termination 20 may mate with a connector mounted in an electronic device. For example, the connector may be mounted on a printed circuit board (PCB) in an electronic device. The opposite end of cable 202 may be similarly configured to mate with another electronic device. Cable 202 may be configured to connect any suitable electronic device to any other suitable device, such a first computer to a second computer, a computer to a server, or a peripheral device, such as a video card, to a motherboard within a computer. Cable 202 may have characteristics selected for the types of signals to pass between the connected devices. For example, cable 202 may comprise a pair of signal conductors 204 and 206, which may be configured to carry a differential signal in some embodiments. Cable 202 may be configured to support signals having any suitable electric bandwidth, such as more than 20 GHz, more than 30 GHz or more than 40 GHz.

FIG. 2B is a cross sectional view of cable. As illustrated, signal conductors 204 and 206 may be surrounded by a dielectric material 208, which may be configured to prevent the signal conductors from contacting one another. Alternatively, or additionally, the signal conductors may be coated with a dielectric material. Signal conductors 204 and 206 may be formed from copper or from a copper alloy, such as copper-zinc, copper-nickel, copper-magnesium, copper-iron, etc. Dielectric material 208 may be enclosed within a conductive layer 209, which may comprise a foil, such as aluminized Mylar foil, or wire braid wrapped around the surface of the dielectric material. Conductive layer 209 may be configured to provide shielding so as to reduce crosstalk between adjacent signal conductor pairs. As illustrated, cable 202 may not include drain wires in some embodiments.

Referring back to FIG. 2A, cable termination 20 may be configured to terminate cable 202, using conductive, compressible member 210 to form an electrical connection between a ground structure of cable 202 and conductive ground shield portions 230 and 232. Conductive, compressible material 210 may be formed using a material having an elongation range percentage that is between 90% and 1120%. In some embodiments, conductive, compressible material 210 may be formed using a material having a tensile strength that is between 4 Mpa and 13 Mpa. In some embodiments, conductive, compressible material 210 may be formed using a material having a tear strength that is between 9 kN/m and 55 kN/m. By way of example and not limitation, conductive, compressible material 210 may be formed using silicone, such as silicone rubber. Various types of silicone rubber may be employed, including high consistency rubber (HCR), fluorosilicone rubber (FSR), liquid silicone rubber (LSR). Conductive, compressible material 210 may be produced by using a vulcanization process, such as room temperature vulcanizing (RTV), and may be molded into a desired shape.

Figure 3:
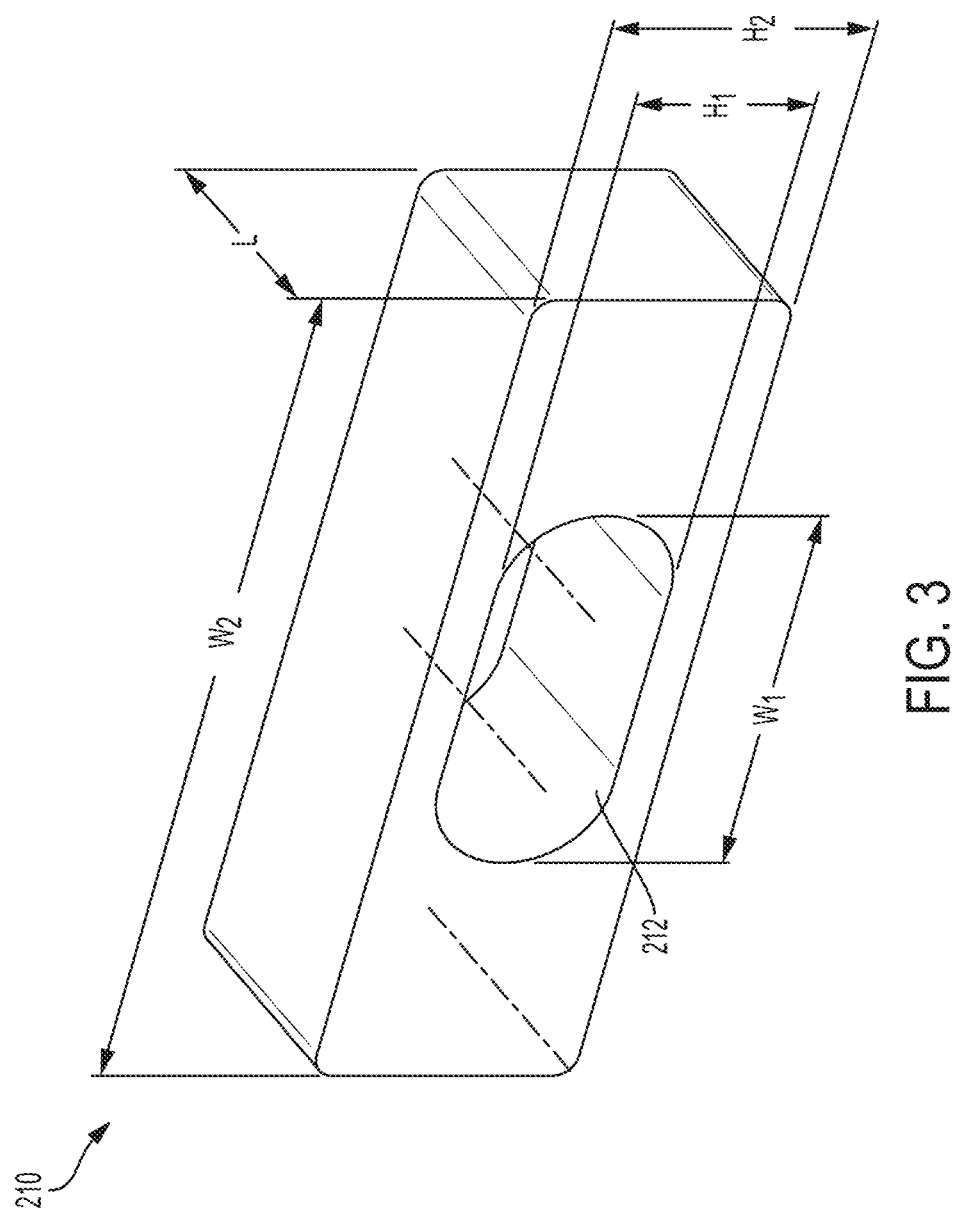
FIG. 3 is an isometric view of an exemplary conductive, compressible member, in accordance with some embodiments.

As illustrated in FIG. 3, conductive, compressible material 210 may be configured to partially or fully encircle cable 202 and to be positioned between an outer conductive layer of the cable and grounding structure in the cable connector terminating the cable. In the embodiment illustrated, compressible material is configured as a unitary member with an opening 212, which may be configured to receive cable 202 therethrough. The opening may have a perimeter large enough to allow cable 202 to fit therein. For example, opening 212 may have a width $W_1$ that is between 0.5 mm and 5 mm in some embodiments, and a height $H_1$ that is between 0.5 mm and 5 mm in some embodiments. Conductive, compressible material 210 may have a width $W_2$ that is between 1 mm and 20 mm in some embodiments, a height $H_2$ that is between 1 mm and 20 mm in some embodiments, and a length that is between 0.5 mm and 10 cm. The dimensions of the conductive, compressible member 210 and of the opening 212 are solely intended by way of example, and are not limited to the ranges provided. The interior perimeter of the opening in an uncompressed state may be greater than the outer perimeter of the cable by at least 0.5% in some embodiments, by at least 1% in some embodiments, by at least 3% in some embodiments, by at least 5% in some embodiments, by at least 10% in some embodiments, by at least 20% in some embodiments or by at least 30% in some embodiments. The interior perimeter of the opening in an uncompressed state may be greater than the outer perimeter of the cable by no more than 5% in some embodiments, by no more than 10% in some embodiments, by no more than 15% in some embodiments, by no more than 25% in some embodiments, by no more than 50% in some embodiments, by no more than 75% in some embodiments or by no more than 100% in some embodiments.

Figure 4:
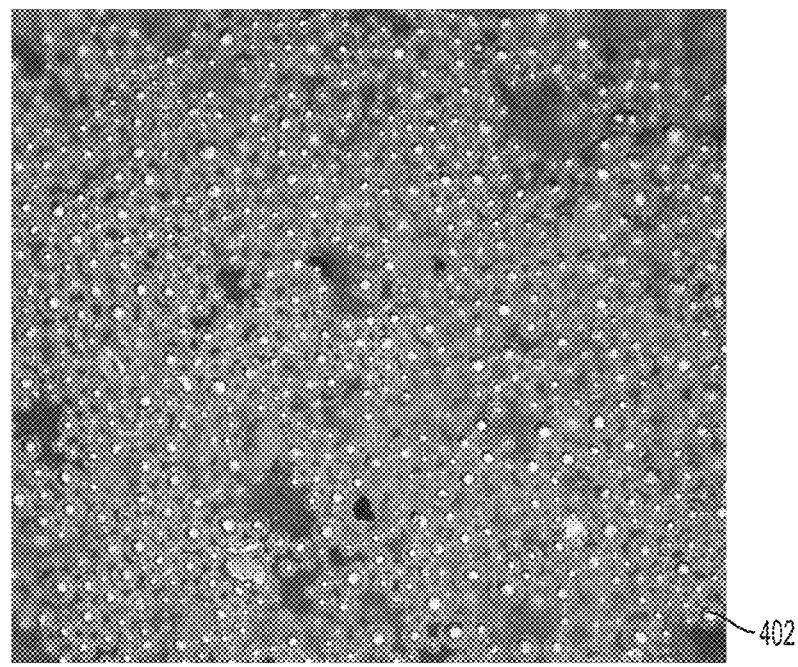
FIG. 4 is a scanning electron microscope (SEM) image illustrating a conductive, compressible material comprising a plurality of conductive particulates, in accordance with some embodiments.

Conductive compressible material may be formed in any suitable way. In some embodiments, conductive, compressive material may comprise a combination of materials, some of which provide desired mechanical properties, and others of which provide desired electrical properties. Conductive, compressible material 210 may comprise a polymer or other compressible material filled with a plurality of conductive particulates, configured to collectively form electrically conductive paths. FIG. 4 is a scanning electron microscope (SEM) image of a conductive, compressible member having a plurality of conductive particulates 402 embedded therein. In some embodiments, the conductive particulates may comprise microspheres, such as silver-plated glass microspheres. Conductive particulates 402 may be disposed so as to form electrically conductive paths between an inner surface of opening 212 and an outer surface of conductive, compressible member 210.

Referring back to FIG. 2A, as part of the process of terminating cable 202, cable 202 may be passed through opening 212 of conductive, compressive member 210, such that at least a portion of opening 212 encloses conductive layer 209. In some embodiments, each signal conductor may pass through a corresponding channel of dielectric member 220. For example, signal conductor 204 may pass though channel 224 and signal conductor 206 may pass though channel 226. At the end of cable, the signal conductors may extend beyond an end of dielectric member 220. Any suitable approach may be used to configure the end of the cable in this way. A known technique for terminating a cable is to strip away, at the end of the cable, components of the cable to expose the signal conductors. In accordance with some embodiments, different components may be stripped away to expose different components of the cable. For example, the jacket, a conductive layer and dielectric may be stripped away at the distal end of the cable to expose signal conductors at the distal end of the cable. In other regions, only the jacket may be removed, exposing the conductive layer.

Termination of cable 202 may be performed by contacting conductive ground shield portions 230 and 232 with a first side and a second side of conductive, compressible member 210 respectively. The ground shield portions may be integrated into the cable termination so that they press against the conductive, compressible member 210 and may cause a compression of the conductive, compressible member 210. Any suitable technique may be used to press one or more ground shield portions against conductive, compressible member 210. In some embodiments, ground shield portions 230 and 232 may be held within a housing. Alternatively or additionally, ground shield portions 230 and 232 may be secured to each other, to provide an interior perimeter partially or totally encircling conductive, compressible member 210. That inner perimeter may be smaller than an uncompressed outer perimeter of conductive, compressible member 210.

In some embodiments, such compression may cause a reduction in the volume of the conductive, compressible member 210. In some embodiments, such compression may cause a reduction in the volume of the opening 212. To ensure that there is compression, which aids in making good electrical contact, the conductive, compressible member may have an outer perimeter that is greater than an inner perimeter of the conductive ground shield formed from conductive ground shield portions 230 and 232. Materials and termination techniques may also be used to aid in electrical connection between conductive, compressible member 210 and conductive ground shield portions 230 and 232 or a conductive layer of a cable. The portions of the conductive ground shield portions 230 and 232 that contact conductive, compressible member 210 may be treated such that there is little or no oxide on the ground shield portions 230 and 232. Such a treatment, for example, may be chemical or mechanical, using known techniques that remove metal oxides. Alternatively or additionally, the treatment may entail applying gold, nickel, nickel/tin alloys or or other metal that resists oxidation.

While FIG. 2A illustrates a conductive ground shield formed from two portions, any other suitable number of portions, each having any suitable shape, may be used. In some embodiments, the conductive ground shield may be configured to further enclose, at least in part, dielectric member 220. Alternatively or additionally, the conductive ground shield may be configured to cover other portions of the termination in addition to conductive, compressible member 210. The ground shields, for example, may extend to partially or totally encircle mating contact portions of a termination to which signal conductors of the cable are attached.

Figure 5A:
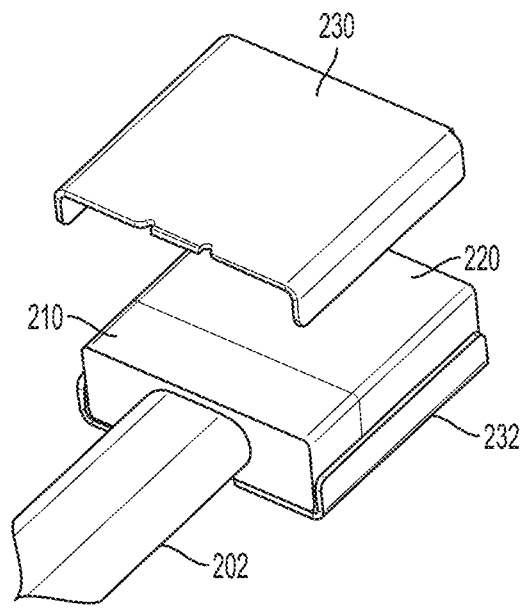
FIG. 5A is an isometric view of the cable assembly of FIG. 2A in a partially assembled configuration, in accordance with some embodiments.

FIG. 5A is an isometric view of the cable assembly of FIG. 2A in a partially assembled configuration, in accordance with some embodiments. In the example illustrated, conductive, compressible member 210 is secured to one side of conductive ground shield portion 232. Conductive ground shield portion 230 is unsecured, but may be secured to conductive ground shield portion 232 using snaps, latches, hubs, bands, or any other suitable attachment mechanism. In some circumstances, the conductive ground shield portions may be manually pressed together using for example, hand tools, such as pliers or wrenches. In other circumstances, the conductive ground shield portions may be pressed together using an automatic assembly machine.

Figure 5B:
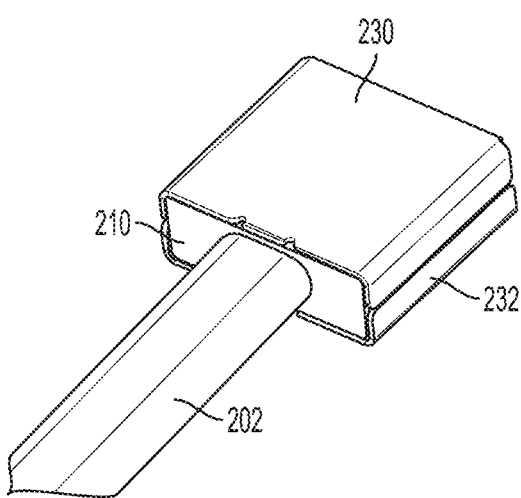
FIG. 5B is an isometric view of the cable assembly of FIG. 2A in a fully assembled configuration, in accordance with some embodiments.

Regardless of how attached, when conductive ground shield portion 230 is attached to conductive ground shield portion 232, as illustrated in FIG. 5B, conductive, compressible member 210 is compressed between the cable and the conductive ground shield. As a result of such compression, opening 212 may reduce in size, and conductive, compressible member 210 may physically and electrically contact cable 202. In such circumstance, the inner surface of opening 212 may electrically contact conductive layer 209 of cable 202. Thus, an aspect of terminating cable 202 may result be compressing, conductive, compressible member 210 into electrical contact with the cable and with the conductive ground shield.

In some circumstances, it may be desirable to control the impedance of the electric termination, and impedance control may be achieved by the shape and/or position of conductive, compressible material. For example, impedance at any location along the length of a conductive element may depend on a distance to a ground conductor, among other factors. The conductive, compressible material may be shaped and positioned to act as the closest ground conductor to a signal conductor in the cable or connector terminating the cable. The conductive, compressible material may be shaped to provide the desired spacing between the signal conductors and the ground structure.

Figure 6:
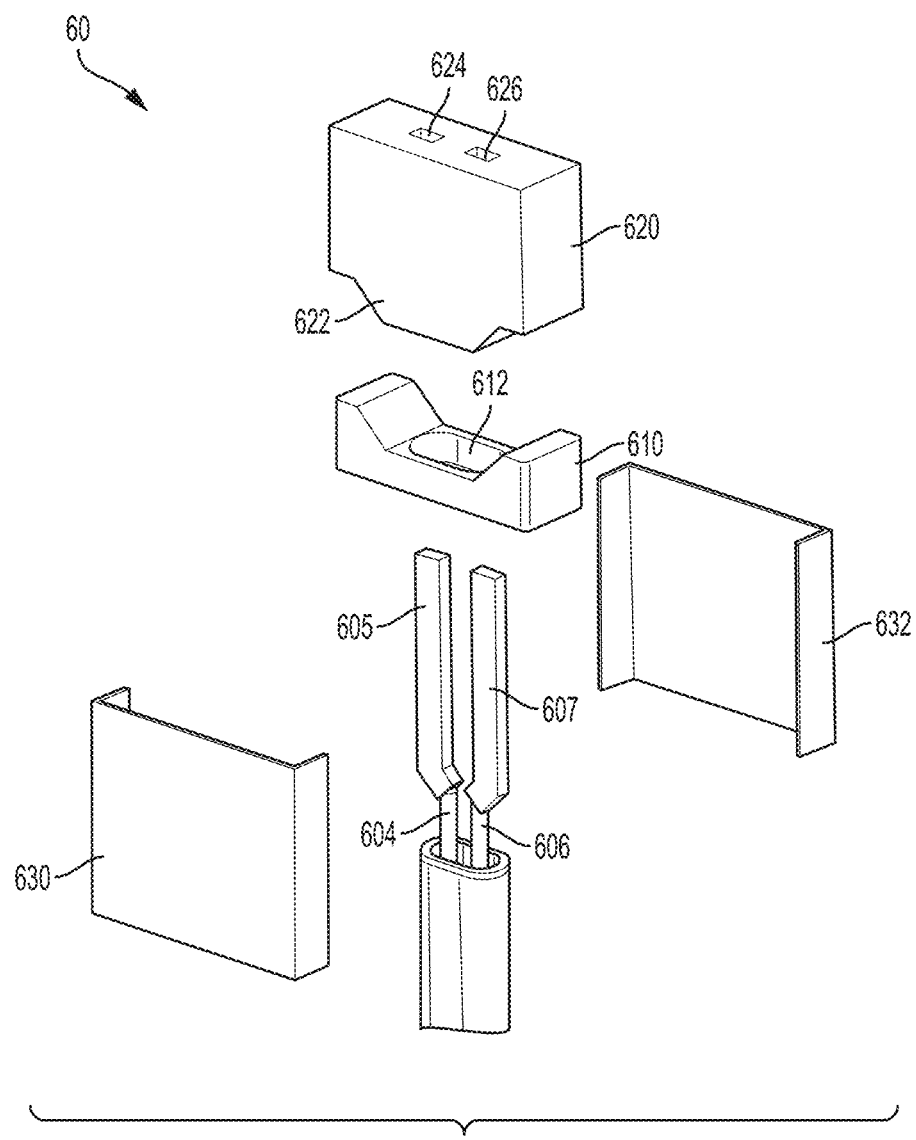
FIG. 6 is an exploded view of another exemplary cable assembly comprising a conductive, compressible member, in accordance with some embodiments.

FIG. 6 is an exploded view of another exemplary termination of a cable assembly comprising a conductive, compressible member, in accordance with some embodiments. As in the non-limiting example on FIG. 2A, termination 60 may be configured to terminate cable 602, using conductive, compressible member 610 and conductive ground shield portions 630 and 632. Termination 60 may comprise an end of cable 602, a conductive, compressible member 610, a dielectric member 620, and a conductive ground shield. In some embodiments, the conductive ground shield may be formed from conductive ground shield portions 630 and 632. Cable 602 may comprise signal conductors 604 and 606, a dielectric material surrounding the signal conductors and a conductive layer, such as a foil or wire braid, enclosing the dielectric material, and the signal conductors (not shown in FIG. 6).

In some embodiments, each signal conductor of cable 602 may be connected to a corresponding conductive portion serving as a mating contact to mate with a signal conductor in a mating connector. For example, signal conductor 604 may be connected to conductive element 605 and signal conductor 606 may be connected to conductive portion 607. The conductive portions and the signal conductors may be connected by soldering, brazing welding or in any other suitable way.

Conductive, compressive member 610 may comprise an opening 612, which may be configured to receive cable 602 therethrough. In contrast to the embodiment of FIG. 3 in which conductive, compressible member 210 is annular with a uniform cross section along the longitudinal direction of the cable, conductive, compressive member 610 may have a cross section that is non-uniform. The non-uniform cross section may be configured to increase the spacing between a centerline of the cable or termination in regions where the signal conductors widen. Conversely, in regions where the signal conductors narrow, the interior surfaces of the conductive, compressive member 610 adjacent the signal conductors may get closer to the center line. Though, it should appreciated be that the distance between the interior surfaces of the conductive, compressive member 610 and the signal conductors may vary to compensate for any characteristic of the other components of the termination, including thickness of the signal conductors, dielectric constant of material surrounding the signal conductors.

In the embodiment illustrated, when assembled, conductive, compressive member 610 may be configured to contact dielectric member 620, which in this example represents a housing of a cable connector that supports mating contact portions of a cable connector. In some embodiments, the contacting surfaces of conductive, compressive member 610 and dielectric member 620 may comprise complementary features. For example, as illustrated in FIG. 6, the contacting surface of dielectric member 620 may comprise a projecting member 622, which may be configured to mate with a depression formed on the contacting surface of conductive, compressive member 610. In this configuration, projecting member 622 may be in contact with conductive, compressive member 610. When termination 60 is assembled, cable 602 may pass through opening 612 and conductive elements 605 and 607 may pass through channels 624 and 626 of dielectric member 620, acting as a housing for a connector module terminating the cable 602. It should be appreciated that, in the exploded view of FIG. 6, conductive elements 605 and 607 are shown outside of channels 624 and 626. In some embodiments, a dielectric member 620 may be formed with channels 624 and 626 into which conductive elements 605 and 607 are subsequently inserted. In other embodiments, dielectric member 620 may be molded around conductive elements 605 and 607, forming channels 624 and 626 in the process. In yet other embodiments, two or more dielectric elements might be positioned around conductive elements 605 and 607, forming channels 624 and 626.

Having complementary features formed on the contacting surfaces of the conductive, compressive member 610 and dielectric member 620 may mitigate variations in impedance caused by air gaps forming between the two members, which may be the case if conductive, compressive member 610 and dielectric member 620 are not properly contacted.

Figure 7A:
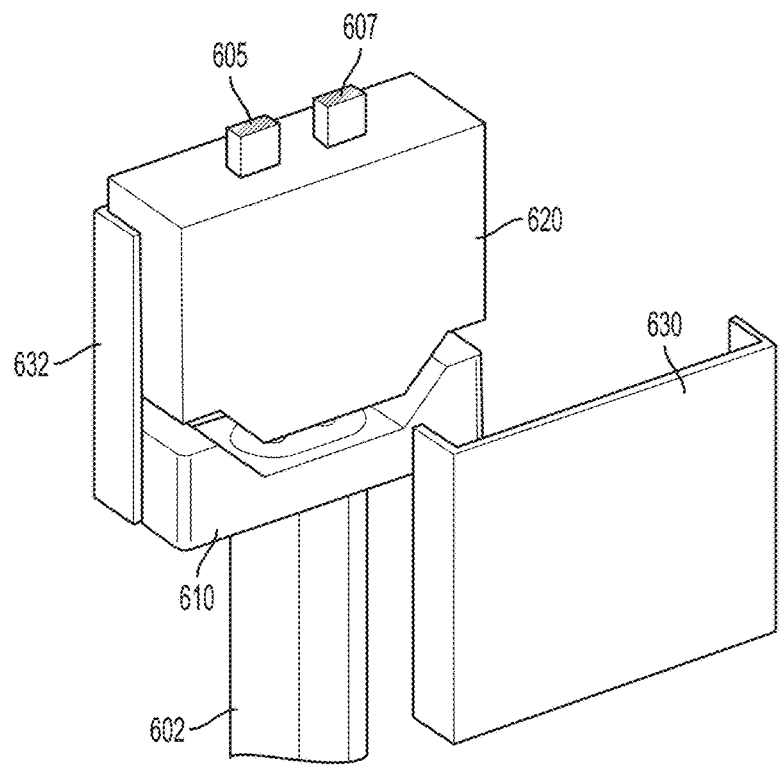
FIG. 7A is an isometric view of the cable assembly of FIG. 6 in a partially assembled configuration, in accordance with some embodiments.
Figure 7B:
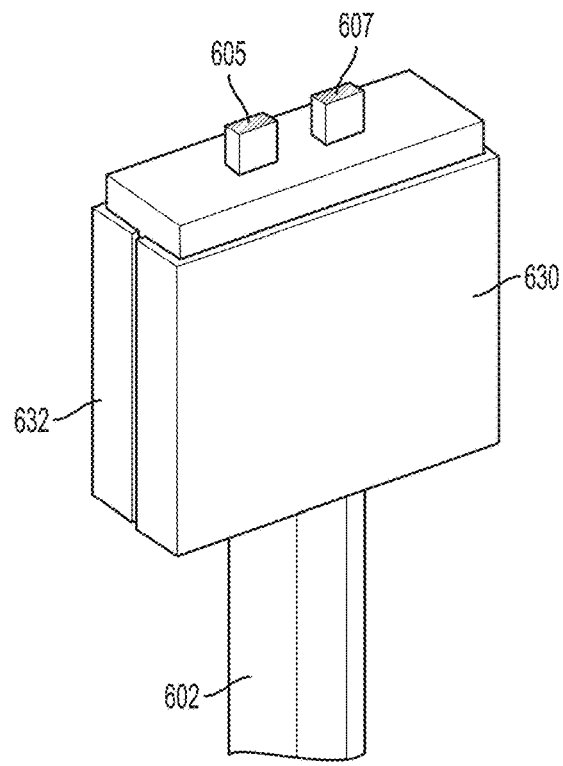
FIG. 7B is an isometric view of the cable assembly of FIG. 6 in a fully assembled configuration, in accordance with some embodiments.

FIG. 7A-7B illustrate termination 60 in a partially assembled configuration and in a fully assembled configuration, respectively. In the partially assembled configuration shown in FIG. 7A, dielectric member 620 is shown holding conductive elements 605 and 607, which here are mating contact portions of signal conductors in a connector module terminating cable 602. As illustrated, dielectric member 602 is a unitary structure, such as may be formed by molding dielectric material around conductive elements 605 and 607. However, it should be appreciated that a housing of dielectric material may be formed in any suitable way, including as multiple separate pieces that are held together using snaps, welding, adhesive, interference fit, etc.

As shown in FIG. 7A, conductive ground shield portion 632 is placed in contact with conductive, compressive member 610 and dielectric member 620. Signal conductors within cable 602 may pass through opening 612 and electrically connect to conductive elements 605 and 607. In the fully assembled configuration, conductive ground shield portion 630 is also placed in contact with conductive, compressive member 610. In this configuration, the conductive ground shield portions may press against the conductive, compressive member 610, thus causing it to reduce in volume. As a consequence, an inner surface of opening 612 may contact the conductive layer of cable 602.

However, it should be appreciated that other construction techniques alternatively or additionally may be used. For example, conductive, compressive member 610 is shown as a unitary structure with an opening to receive a cable. However, it should be appreciated that portions of the conductive, compressive material forming conductive, compressive member 610 may be attached to conductive ground shield portions 630 and 632, respectively. The material may be shaped such that, when conductive ground shield portions 630 and 632 are pressed together, the conductive, compressive material encircles cable 602.

Figure 8:
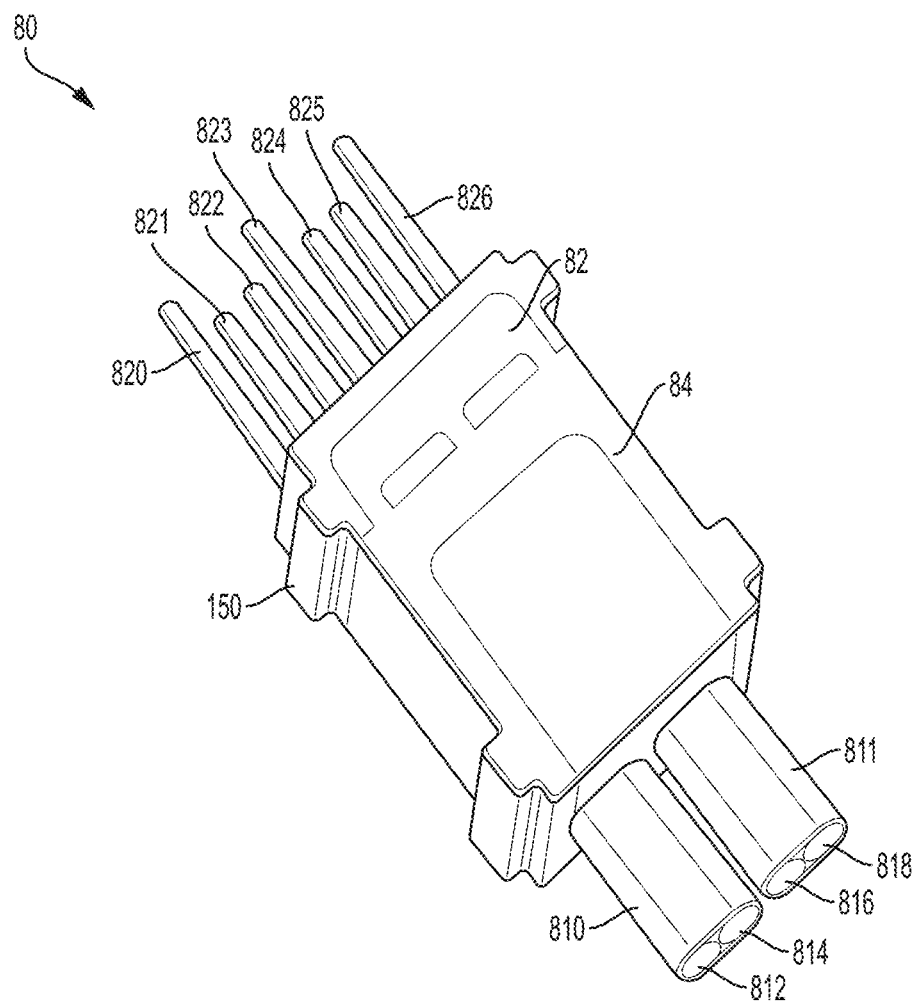
FIG. 8 is an isometric view of a cable module, in accordance with some embodiments.

In some embodiments, connector modules may be attached to cables, creating cable assemblies that may be used to connect electronic devices. Each module may comprise one or more conductive, compressible members configured to terminate one or more cables in the manner described above. A non-limiting example of such module is illustrated in FIG. 8. The modules may comprise mating contact portions configured to mate with mating contact portions in a mating connector. In the embodiment illustrated, the mating contact portions are pin-shaped, and are configured to mate with mating contact portions in a receptacle. In some embodiments, multiple modules like module 80 may be held together, side-by-side, to form a connector terminating a cable assembly.

Termination 80 may comprise a module 150, terminating a pair of cables 810 and 811, which may be of the type described in connection to FIG. 2A, 2B or 6. Signal conductors in cable 810 may be coupled to mating contact portions 812 and 814. Signal conductors in cable 811 may be coupled to mating contact portions 816 and 818. The cables may each comprise a conductive layer enclosing the signal conductors.

Module 150 may include a housing portion 82. Housing portion 82 may be formed of a dielectric material, and may hold mating contact portions 812 and 814. In some embodiments, mating contact portions may be held by housing portion 82 with ends exposed. Those ends may be attached to wires within cables 810 and 811, using techniques such as welding, brazing or soldering. However, the specific attachment technique is not critical to the invention, and any suitable attachment technique may be used.

Module 150 may comprise a conductive, compressible member of the type described herein. In the embodiment illustrated, member 84 may be formed of a conductive, compressive material. In some embodiments, member 84 may be injected in a molding operation into an opening in housing portion 82. In this way, member 84 may be attached to housing portion 82. However, other assembly techniques may be used, including inserting a cable into an opening in member 84 or assembling member 84 from multiple separate pieces of conductive, compressive material. Regardless of how member 84 is integrated into module 152 it may be positioned to contact conductive layers exposed on exterior surfaces of cables 810 and 811 and grounding structures within module 152. In some embodiments, those grounding structures may be conductive ground shields (not shown in FIG. 8) configured to compress the conductive, compressible member. Conductive ground shields, for example, may have planar portions pressing against the exposed surfaces of member 84.

In some embodiments, the conductive, compressible member may also make contact with conductive elements that form mating contact portions for grounds of module 150. In the embodiment of FIG. 8, the mating contact portions of the conductive elements in the module 150, including both signal conductors and ground conductors, may be positioned in a column. When like modules are stacked side-by-side, the mating contact portions may form a two-dimensional array of mating contact elements, providing a connector interface.

In some embodiments, signal conductors 812 and 814 may be electrically connected to conductive elements 821 and 822, and signal conductors 816 and 818 may be electrically connected to conductive elements 824 and 825. Conductive elements 820, 823 and 826 may be connected to the conductive layers of cables 810 and 811 via conductive, compressible members disposed in the housing 82, such that conductive elements 820, 823 and 826 serve as aground conductors. Such a connection may be formed in any suitable way, including by having conductive elements 820, 823 and 826 integrally formed with or attached to grounding structures pressing against portion 84. However, it should be appreciated that other approaches for making connections using a conductive, compressive material may be used. In some embodiments, a conductive compressive member may be pressed into both a conductive outer layer of a cable and a portion of the conductive elements 820, 823 and 826. For example, portions of conductive elements 820, 823 and 826 within housing 82 may be widened with respect to the mating contact portions visible in FIG. 8. Those widened portions may be adjacent an outer conductive layer of cables 810 and/or 811 such, when the conductive compressive member is pressed against the conductive layer of the cable, it is also pressed against a portion of conductive elements 820, 823 and 826.

Figure 9:
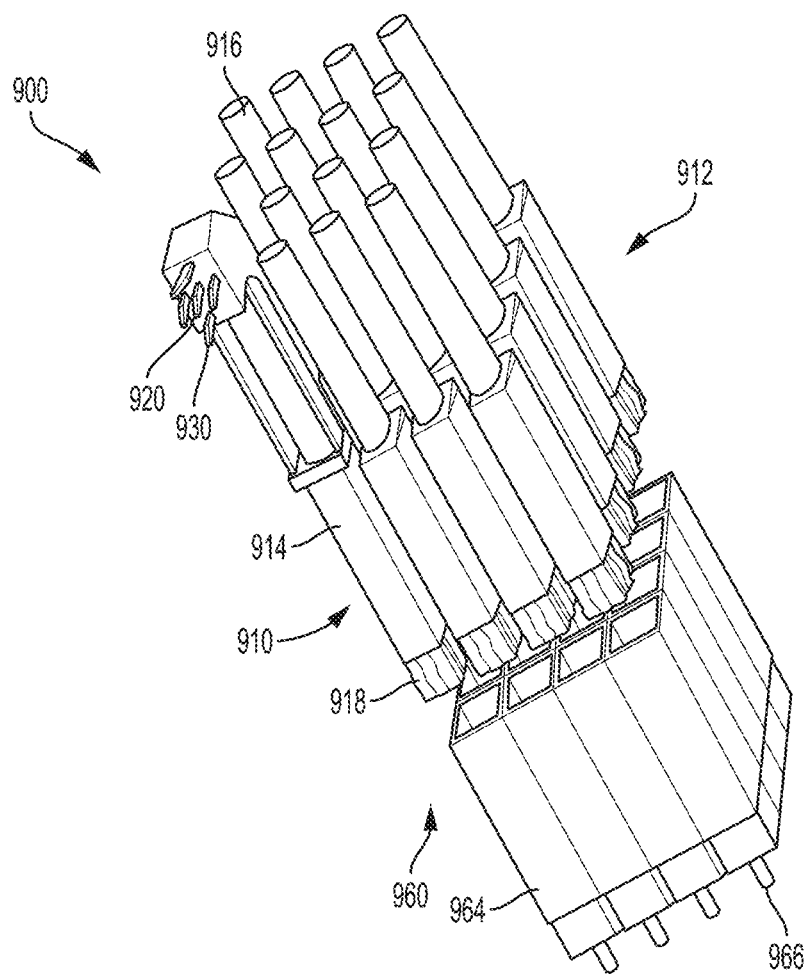
FIG. 9 is an isometric view of an interconnection system comprising a plurality of cable assemblies, in accordance with some embodiments.

FIG. 9 illustrates an interconnection system comprising a plurality of electric terminations of the type described herein. Interconnection system 900 may comprise electrical connector 910 and electrical connector 960. Electrical connector 910 may comprise a plurality of cable assemblies 912, which may be implemented using, at one end of the cables, termination 20 or termination 60, or any other suitable termination.

Each cable assembly 912 may comprise a conductive ground shield 914, which may be configured to compress a respective conductive, compressible member (not shown in FIG. 9) when attached to the termination. Each conductive, compressible member may be shaped to contact an outer conductive layer of a cable, such as by having an opening which may be configured to receive a respective cable 916 therethrough. Each cable 916 may comprise one or more signal conductors.

An opposite end of the cables may also be terminated. The nature of the termination may depend on the intended use of the cable assemblies. In some embodiments, the terminations at the opposite end may be the same as terminations 20 or 60 or other termination as described herein. In other embodiments, cables 916 may be configured to connect to a circuit board at a right angle by terminating the other end of the cable assemblies with modules that have contact tails adapted for attachment to a printed circuit board. In such embodiments, an end of the cable may be coupled to a connection portion 920, which may comprise a plurality of conductive tails 930. At least one of the conductive tails may be electrically connected to the conductive layer of a respective cable. That connection may be made through the use of compressive, conductive material as described herein, though any suitable attachment mechanism may be used. Additional conductive tails may each be electrically connected to a signal conductor. However, the application is not limited in this respect and electrical connector 910 may be configured to connect to an electronic device in any suitable way.

The cable assemblies of electrical connector 910 may be configured to be inserted into corresponding receptacles of electrical connector 960. Each receptacle may comprise a housing 964. In some embodiments, the housings 964 may be electrically connected to each other, and may be connected to a reference potential, such as a ground terminal. When inserted into a corresponding receptacle, a conductive ground shield may electrically contact an internal surface of a housing 964, thus placing the cable's conductive layer at the electric potential of the reference terminal. In some embodiments, a conductive ground shield may comprise one or more conductive tabs 918, which may be configured to bend when the cable assembly is inserted in the corresponding receptacle and to electrically contact a housing 964. Electrical connector 960 may be configured to be mounted on a printed circuit board, such as a motherboard, though conductive tails 966.

Having thus described several aspects of at least one embodiment of this invention, it is to be appreciated that various alterations, modifications, and improvements will readily occur to those skilled in the art.

For example, a compressive conductive member was illustrated as being a unitary structure with an opening slightly larger than the outer surface of a cable with an exposed conductive layer. Such a structure may be readily formed by extruding conductive compressive material in a tube and slicing segments of a desired length. However, it is not a requirement that the conductive compressive member be a unitary member, and other manufacturing techniques may be used, including forming separate pieces of conductive compressive material and adding them to a connector or molding conductive compressive material onto other components while still in an uncured or partially cured state and allowing the conductive compressive material to cure in place. Such an approach may be readily implemented with conductive compressive material implemented with a silicone matrix or matrix of any other polymer that might be cured, such as a result of adding a curing agent, passage of time, exposure to heat, UV light or other source of energy, or in any other way.

Figure 10C:
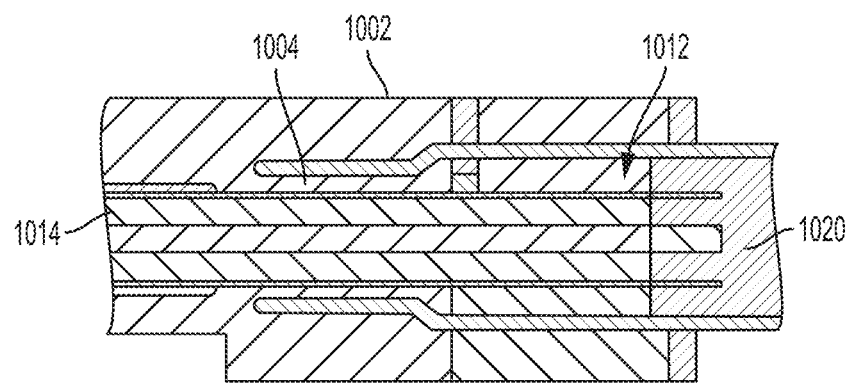

In some embodiments, conductive, compressive material may be attached to a portion of a cable assembly such that, when the cable is terminated, the conductive compressive material is compresses between the cable's conductive layer and the conductive ground shield. For example, conductive, compressive material may be attached to the conductive ground shield. FIGS. 10A-10C illustrate a representative configuration in which a conductive, compressive material is attached to a conductive ground shield. In particular, FIGS. 10A and 10B are an isometric view and an exploded isometric view of a conductive ground shield 1002. Conductive ground shield 1002 may be a unitary piece, or may be formed from multiple pieces assembled together. Conductive ground shield 1002 is arranged to form an opening 1010 there through. Conductive ground shield 1002 may enclose opening 1010, fully or partially, which may be configured to receive a cable therein.

As illustrated, conductive, compressive member 1004 may be connected to the conductive ground shield 1002, and may at least partially be positioned inside opening 1010. Conductive, compressive member 1004 may be attached to conductive ground shield 1002 in any suitable way. For example, conductive, compressive member 1004 may be molded onto conductive ground shield 1002 while still in an uncured or partially cured state and may be cured in place. Any suitable molding techniques may be used, including but not limited to two-shot injection molding, extrusion molding, compression molding, transfer molding, thermomolding, blow molding, rotational molding, structural foam molding, shrink wrap molding, and over molding.

In some embodiments, conductive, compressive material 1004 is attached to the inner wall of conductive ground shield 1002 (e.g., in opening 1010) and to the outer wall, as illustrated in FIG. 10B. Conductive, compressive member 1004 may be made of any one of the materials described above and may have conductive particulates embedded therein, as described in connection with FIG. 4. Additionally, or alternatively, conductive, compressive member 1004 may be made of a thermoplastic elastomer, polypropylenes, polyoefins, liquid crystal polymers, or silicon rubber, among others. Conductive, compressive member 1004 may have a surface resistance that is less than $10\ \Omega/in^2$, in some embodiments.

Conductive, compressive member 1004 may be arranged and sized such that, when conductive ground shield 1002 is mounted with a cable, conductive, compressive member 1004 is compressed between the cable and conductive ground shield 1002. In this way, a conductive path between the cable's conductive layer and the conductive ground shield may be formed. For example, conductive, compressive member 1004 may comprise one or more protrusions 1006 extending away from conductive ground shield 1002. When a cable is received in the opening 1010, protrusion(s) 1006 may be arranged to be compressed between the cable and the shield.

FIG. 10C illustrated a cable 1014 inserted into an opening 1010. As illustrated, conductive, compressive member 1004 fills, at least partially, the space between the cable 1014 and the conductive ground shield 1002. In this way, a conductive path between the cable's conductive layer 1012 and the shield is formed, thereby terminating the cable. As further illustrated in FIG. 10C, the assembly may be connected to a connector 1020.

Figure 11B:
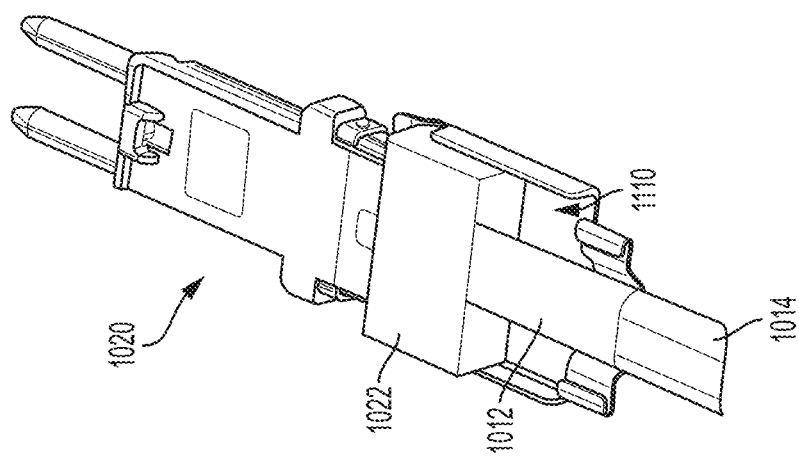
FIGS. 11A-11B illustrate a cable assembly forming a void which may be filled, at least partially, with a conductive, compressive member, in accordance with some embodiments.
Figure 11A:
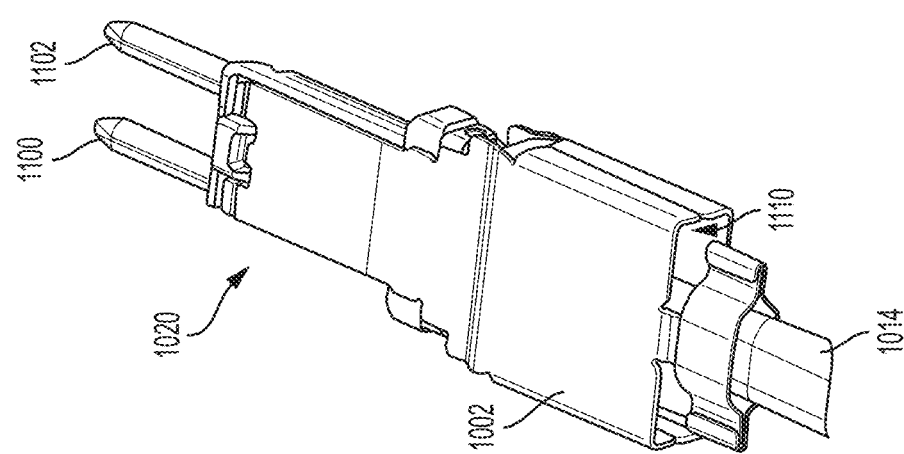

FIGS. 11A-11B illustrate an exemplary cable assembly for use in connection with termination techniques described. FIG. 11A is an isometric view and FIG. 11B shows the assembly of FIG. 11B where a portion of the conductive ground shield has been removed. As illustrated, connector 1020 is connected to cable 1014, which is terminated using a conductive ground shield 1002. Connector 1020 includes contacts 1100 and 1102. When mated, cable 1014 is in electrical contact with contacts 1100 and 1102. Cable 1014 and connector 1020 may be connected via dielectric member 1022.

Conductive ground shield 1002 may be arranged such that a void 1110 is formed between the shield and the cable. In some embodiments, void 1110 may be filled, at least partially, with a conductive, compressive members of the type described herein (e.g., conductive, compressive member 210, 610 or 1004). When the cable is assembled with the shield, the conductive, compressive member may contact, physically and electrically, conductive layer 1012 and conductive ground shield 1002.

As another example, use of conductive, compressive material was illustrated in connection with specific connector configurations, and particularly in connection with making connections to a conductive layer of a cable. This approach may be used in other connector structures to connect members intended to be grounded.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Also, circuits and modules depicted and described may be reordered in any order, and signals may be provided to enable reordering accordingly.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An electrical termination comprising:
   a conductive ground shield enclosing, at least in part, an end of a flexible cable; and
   a conductive, compressible member disposed between, and in electrical contact with, the end of the cable and the conductive ground shield, the conductive, compressible member being molded to the conductive ground shield, wherein the conductive, compressible member comprises an elastomer and a plurality of conductive particulates embedded in the elastomer.

2. The electrical termination of claim 1, wherein the end of the cable comprises an exposed conductive layer surrounding, at least in part, signal conductors, and the conductive, compressible member is in physical and electrical contact with the conductive layer.

3. The electrical termination of claim 2, wherein the conductive, compressible member is configured to press against the conductive layer when the compressible member is compressed by the conductive ground shield.

4. The electrical termination of claim 1, wherein the conductive ground shield is configured to compress the conductive, compressible member.

5. The electrical termination of claim 4, wherein the cable passes through an opening formed in the conductive, compressible member, and wherein the opening is configured to reduce in size when the conductive, compressible member is compressed by the conductive ground shield.

6. The electrical termination of claim 4, wherein, when the conductive, compressible member is compressed by the conductive ground shield, the conductive, compressible member exhibits a lower electrical resistance relative to when the conductive, compressible member is uncompressed.

7. The electrical termination of claim 1, wherein the plurality of conductive particulates are configured to form a conductive path between an outer surface of the conductive, compressible member and an inner surface of an opening formed in the conductive compressive member.

8. The electrical termination of claim 1, wherein, the conductive, compressible member is compressed by the conductive ground shield, such that the cable makes electrical connection with the conductive ground shield with an electrical resistance of less than 100 Ohms.

9. The electrical termination of claim 1, wherein the conductive, compressible member, in an uncompressed state, has a perimeter that is greater than a perimeter of the conductive ground shield.

10. The electrical termination of claim 1, wherein the conductive, compressible member is made, at least in part, from silicone.

11. The electrical termination of claim 1, wherein the conductive ground shield individually encloses the flexible cable, and wherein the flexible cable comprises a single pair of signal conductors.

12. The electrical termination of claim 1, wherein the plurality of conductive particulates comprise silver-plated microspheres.

13. The electrical termination of claim 1, wherein the flexible cable is a twin-ax cable without a drain wire.

14. The electrical termination of claim 1, wherein the conductive, compressible member is in contact with an inner surface of the conductive ground shield and an outer surface, opposite the inner surface, of the conductive ground shield.

15. The electrical termination of claim 1, wherein the conductive, compressible member is a unitary member.

16. An electrical connector comprising:
a plurality of cable assemblies disposed in one or more columns, each one of the plurality of cable assemblies comprising an electrical termination for individually terminating a cable of a plurality of cables, each cable having a single pair of signal conductors and comprising an end, wherein each electrical termination comprises:
the end of a corresponding cable of the plurality of cables;
a conductive ground shield enclosing, at least in part, the end of the corresponding cable; and
a conductive, compressible member disposed between, and in electrical contact with, the end of the corresponding cable and the conductive ground shield.

17. The electrical connector of claim 16, wherein the end of the corresponding cable comprises an exposed conductive layer surrounding, at least in part, the corresponding pair of signal conductors, and the conductive, compressible member is in physical and electrical contact with the conductive layer.

18. The electrical connector of claim 17, wherein the conductive, compressible member is configured to form a contact of less than 25 Ohms with the conductive layer when the conductive, compressible member is compressed by the conductive ground shield.

19. The electrical connector of claim 16, wherein the conductive ground shield is configured to compress the conductive, compressible member in a second direction perpendicular to the first direction.

20. The electrical connector of claim 19, wherein the corresponding cable passes through an opening formed in the conductive, compressible member, and wherein the opening is configured to reduce in size when the conductive, compressible member is compressed by the conductive ground shield.

21. The electrical connector of claim 16, wherein the conductive, compressible member is formed from an elastomer and a plurality of conductive particulates embedded in the elastomer and placing the conductive ground shield in electrical connection with the end of the corresponding cable.

22. The electrical connector of claim 21, wherein the plurality of conductive particulates are configured to form a conductive path between an outer surface of the elastomer and an inner surface of an opening formed in the elastomer.

23. The electrical connector of claim 21, wherein the plurality of conductive particulates comprise silver-plated microspheres.

24. The electrical connector of claim 16, wherein the conductive, compressible member has a perimeter that is greater than a perimeter of the conductive ground shield.

25. The electrical connector of claim 16, wherein each one of the plurality of cable assemblies is configured to mate with a respective receptacle, and each one of the plurality of cable assemblies further comprises at least one tab connected to the conductive ground shield and configured to electrically contact a housing of the respective receptacle.

26. The electrical connector of claim 16, wherein the conductive, compressible member is made, at least in part, from silicone.

27. The electrical connector of claim 16, wherein the plurality of cables are twin-ax cables without drain wires.

28. The electrical connector of claim 16, wherein the conductive, compressible member comprises at least one material selected from the group consisting of a high consistency rubber (HCR), a fluorosilicone rubber (FSR) and a liquid silicone rubber (LSR).

29. The electrical connector of claim 16, wherein the conductive, compressible member is a unitary member.

* * * * *